United States Patent [19]

Boucher et al.

[11] Patent Number: 5,764,894
[45] Date of Patent: Jun. 9, 1998

[54] SYSTEM FOR COMMUNICATING WITH NETWORK HAVING FIRST OPERATING SYSTEM IN CHARGE OF UPPER COMMUNICATION LAYERS AND SECOND OPERATING SYSTEM IN CHARGE OF LOWER COMMUNICATION LAYERS

[75] Inventors: Gérard Boucher, Le Perray en Yvelines; Jean-Marc Gillon, Andresy; Robert Perrin, Paris; Paul Ravaux, Les Clayes sous Bois, all of France

[73] Assignee: Bull S.A., Louveciennes, France

[21] Appl. No.: 513,847

[22] PCT Filed: Mar. 9, 1994

[86] PCT No.: PCT/FR94/00261

§ 371 Date: Sep. 11, 1995

§ 102(e) Date: Sep. 11, 1995

[87] PCT Pub. No.: WO94/21074

PCT Pub. Date: Sep. 15, 1994

[30] Foreign Application Priority Data

Dec. 3, 1993 [FR] France .................... 93 02902

[51] Int. Cl.⁶ .................... G06F 13/00
[52] U.S. Cl. .................... 395/200.8; 395/200.57; 395/200.67
[58] Field of Search .................... 364/200; 395/200.13, 395/500, 650, 700, 200.8, 200.57, 200.67

[56] References Cited

U.S. PATENT DOCUMENTS

| | | | |
|---|---|---|---|
| 5,027,271 | 6/1991 | Curley et al. | 364/200 |
| 5,113,522 | 5/1992 | Dinwiddie, Jr. et al. | 395/700 |
| 5,408,661 | 4/1995 | Kuranaga | 395/650 |
| 5,483,647 | 1/1996 | Yu et al. | 395/500 |
| 5,517,622 | 5/1996 | Ivanoff et al. | 395/200.13 |

FOREIGN PATENT DOCUMENTS

| | | |
|---|---|---|
| 0255096 | 3/1988 | European Pat. Off. |
| 8903086 | 6/1989 | WIPO |

OTHER PUBLICATIONS

6TH Mediterranean Electrotechnical Conference 22 May 1991 Ljubljana, Slovenie pp. 1025–1028 Veiga et Jepsen "SESTA: A Personal Computer FTAM and VT System" see the whole document.

Proceedings Computer Networking Symposium 17 Nov. 1986 Washington D.C., ETATS-UNIS pp. 205–213 Amirfaiz "Design and Implementation of a Generic Gateway" see pp. 209, left column, paragraph 3—right column, paragraph 2.

Primary Examiner—Thomas C. Lee
Assistant Examiner—David Ton
Attorney, Agent, or Firm—Kerkam, Stowell, Kondracki & Clarke, P.C.; Edward J. Kondracki

[57] ABSTRACT

A communication system for communicating with a network which includes a computer associated by means of a bus with a communication processor which is itself linked to a specific link of the network, the computer including a first operating system, and the processor including a second operating system, which handles the transmission of data from the bus to the network and vice versa. The communication system includes a telecommunication server associated with the first operating system, and a communication code which belongs to at least one open systems interconnection model associated with the second operating system, wherein the server provides the first operating system with access means to the various layers of the code, this code implementing the specific protocols of each layer, in order to enable transmission to the host or to the network.

5 Claims, 4 Drawing Sheets

SYSTEM FOR COMMUNICATING WITH NETWORK HAVING FIRST OPERATING SYSTEM IN CHARGE OF UPPER COMMUNICATION LAYERS AND SECOND OPERATING SYSTEM IN CHARGE OF LOWER COMMUNICATION LAYERS

BACKGROUND OF THE INVENTION

The present invention relates to a system for communicating with a network. The invention is particularly applicable to a network of the FDDI type in which the transmission medium is constituted by fiber optics, a network which is standardized by ANSI under the reference number X3T9-5, and by ISO, the International Standards Organization.

It is known that networks are constituted by a plurality of terminals or stations linked to one another by a transmission link (in the case of an FDDI-type network, the corresponding transmission medium is constituted by fiber optics). A computer linked to a network is considered a terminal.

Numerous modern networks operate in accordance with the same reference model. The most widely known are the OSI or TCP-IP reference models. These models are similar with regard to the definition of their architecture in the form of standardized layers. Thus, in the OSI model, there are seven different activity layers, the bottom layer (layer 1) corresponding to the physical transmission of signals, and the top layer (layer 7) corresponding to the functions carried out by the application programs (more simply called applications) and the users of the network in question.

The trend in the technological development of networks and the utilization of greater and greater numbers of terminals is leading to the development of communication processors, which are most often associated with a computer for the purpose of reducing the load on its central processor by carrying out part of the management of its communications with the other terminals in the network. In a given network, computers of different types using different operating systems can be made to communicate.

The association of a computer and a communication processor constitutes what may be called a system for communicating with a network.

In this association, the role of the communication processor (which can also be called a data transmission system) is to adapt the conditions for transmitting information through the bus of the computer to which it is connected to the conditions for transmitting through the network, which are totally different. A communication processor of this type allows applications which are supported by several operating systems in various computers to communicate with one another. In particular, it allows the various communication layers of the operating system of a first computer to communicate with the various communication layers of the operating systems of other computers which are directly or indirectly connected to this same network. For example, a communication processor of this type is known which has the simplified architecture shown in FIG. 1, and which is described, for example, either in the French patent application No. 9213653 filed Nov. 13, 1992 by the Applicant under the title "Tool for Simulating a Network Code," or in the French patent application No. 9215521 with the title "System for Transmitting Data between a Computer Bus and a Network," filed Dec. 22, 1992 by the instant Applicant.

A communication processor of this type, designated NCC, makes it possible to assure the management of data transfers between a computer HOST, which is equipped with an internal bus PSB and whose operating system is designated $SE_1$, and a network RE, which is an FDDI-type network, for example. The bus PSB is, for example, a bus of the MULTIBUSII type (a trademark registered by the Intel Corporation) standardized according to IEEE (Institute of Electrical and Electronic Engineers) standard 1296.

A processor NCC of this type includes the following three essential parts:

the first part, called a GPU (English acronym for General Purpose Unit) is, for example, the model described in French patent application No. 9108908 filed Jul. 15, 1991 by BULL S. A., under the title "Universal Device for Coupling a Computer Bus to a Controller of a Group of Peripherals". This part is equipped with an operating system, for example a system of the type described in French patent application No. 9108907 filed the same day as the above, by the same applicant, under the title "Operating System for a Universal Device for Coupling a Computer Bus to a Specific Link of a Network". The purpose of this part GPU is to assure the initialization of the coupler assembly NCC on one hand, and to assure a communication with the computer HOST through the bus PSB on the other hand, while complying with the utilization standards for this bus and conforming to the nature of the operating system $SE_1$ of the computer HOST. Furthermore, the part GPU assures the physical transfer of data between the bus PSB and the second part DEA, called an adaptor device, which is directly connected to the network RE. The function of this part DEA is described below.

the part DEA is, for example, a part of the type described either in French patent No. 2 650 412 with the title "Gateway Device for Connecting a Computer Bus to a Fiber Optic Ring Network" as far as the hardware is concerned, or in French patent application No. 92 11054 as far as the software is concerned. This part DEA assures the physical transmission of data between the part GPU and the network RE, as well as the physical connection to the network.

the third part, called PPA, is actually a communication coprocessor which is more particularly intended for the management of the various telecommunication layers of the OSI model, or the TCP-IP model. For the OSI model, as well as for the TCP-IP model, the part PPA assures the management of the communication layers $C_4$, $C_3$, $C_2$, that is, the transport, network, and data link layers, respectively.

The communication layers $C_2$ through $C_4$ communicate with one another by means of primitive functions which allow two adjacent layers to communicate with one another. Thus the two layers $C_2$ and $C_3$ communicate with one another by means of the set of functions ST2, while the layers $C_3$ and $C_4$ communicate by means of the set of functions ST3. Moreover, $C_4$ communicates with the external environment, for example with external applications, by means of an interface SH.

In a preferred embodiment of the instant the invention, the sets of functions ST2, ST3, SH are functions which are known in current practice by the name STREAMS. These standard functions are defined by the following documents, for example:

Unix System V Release 4—STREAMS Programmer's Guide, ATT Issue 1

Unix System V Release 3.2—STREAMS Programmer's Guide, ATT (ISBN 0-13-944810-1), 1989.

In the examplary embodiment shown in FIG. 1, when the computer HOST sends a message to the network RE, or even when a message comes from the network RE, it passes through the layers $C_2$ through $C_4$ of PPA through a FIFO memory, either $FF_1$ or $FF_2$, in accordance with which this message is transmitted to DEA or to GPU, respectively. When seeking to establish a connection request, or to send messages to all or some of the stations connected to the network, whether originating from or going to the host computer HOST, this connection or these messages pass through SH.

The layers $C_2$ through $C_4$ and the various functions ST2, ST3 and SH, as well as the operating system of the part PPA, constitute the communication layer code CC which is implemented by the communication coprocessor PPA.

The essential role of the communication coprocessor PPA is to relieve the host system of the management of the communication layers which it normally carries out, while maintaining extremely high performance in the communication processor NCC, as far as the data transmission rate to or from the network is concerned.

Furthermore, it may be noted that the part GPU includes a part HIA which links it to the bus PSB. HIA, which can also be called a host adaptor, varies with the nature of the internal bus of the host adaptor. In the case in which PSB is a MULTIBUSII bus, the part HIA is formed by a coprocessor of the $VN82C_389$ type, manufactured by the Intel Corporation.

The association of the computer HOST equipped with its operating system $SE_1$, which is for example a system of the GCOS7 type developed by Applicant, with the communication processor NCC constitutes the communication system SCI of which the present invention constitutes a particularly advantageous embodiment, which makes it possible to obtain high performances relative to the data transfer rate.

SUMMARY OF THE INVENTION

It is a primary object of the present invention to provide a system for communicating with a network, which includes a computer connected by means of a bus to a communication processor which is itself linked to the specific link of the network, the computer including a first operating system associated with a plurality of applications which exchange data with the terminals connected to the network and a first input/output manager which organizes within the bus the transfer of data to a second input/output manager of the processor, which includes a second operating system which organizes the operation of the processor in order to transmit the data from the bus to the network and vice versa, wherein the system includes:

- a communication server associated with the first operating system,
- a communication code, which belongs to at least one open systems interconnection model, associated with the second operating system, the server providing the first operating system with means of access to the various communication layers of the code which implement the specific protocols for each layer, in order to assure transmission to the host or to the network.

BRIEF DESCRIPTION OF THE DRAWINGS

Other characteristics and advantages of the present invention will become apparent in the following description given by way of a non-limiting example and in reference to the appended drawings, in which.

DETAILED DESCRIPTION OF THE PREFERRED EMBODIMENTS

Figure 2:
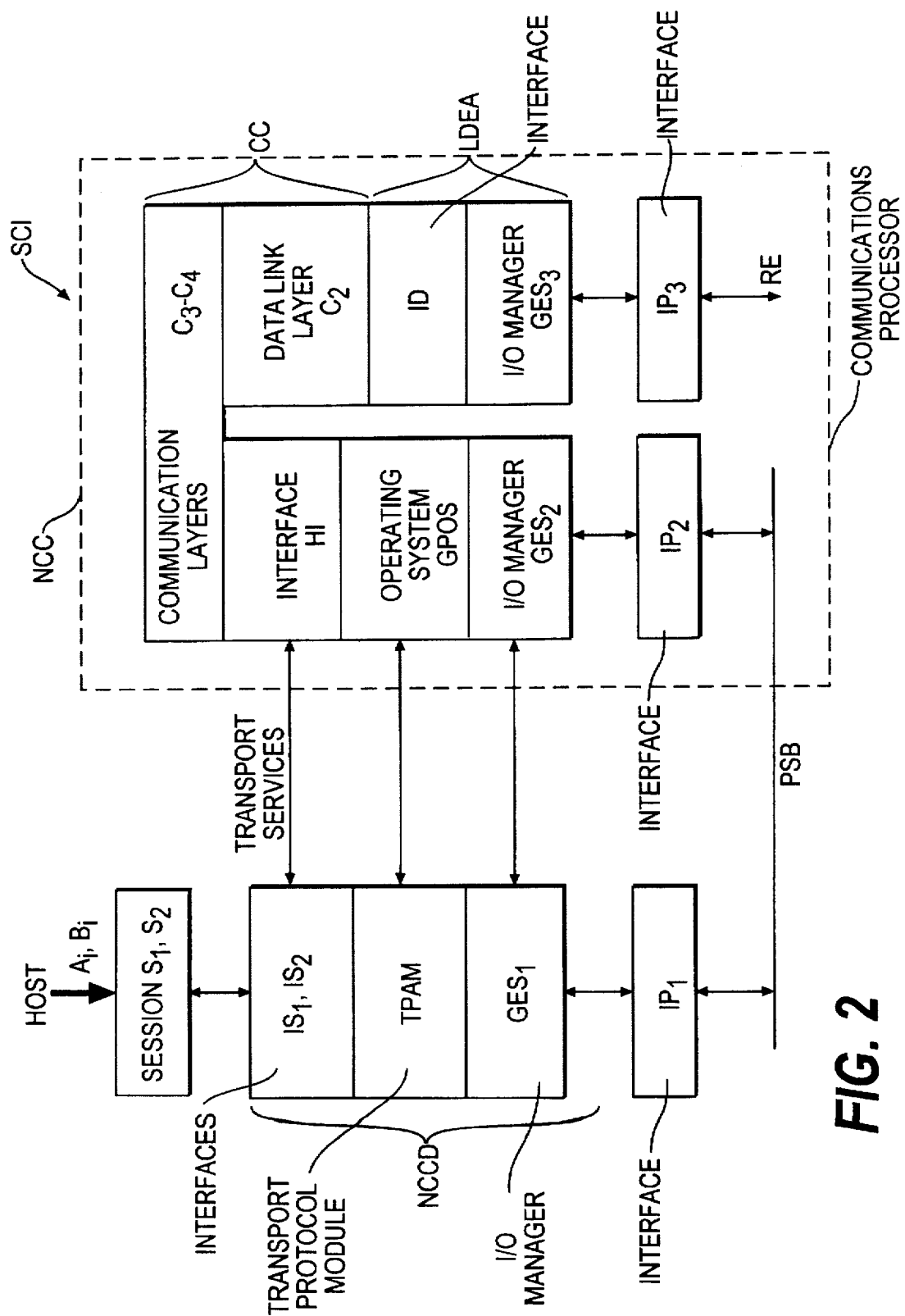
FIG. 2 shows the essential elements constitute the software architecture of the communication system according to the instant invention.

Referring now, more particularly to FIG. 2, which shows the software architecture of the computer HOST and the communication processor NCC.

The elements of the software architecture of HOST are the following:

- a plurality of applications $A_i$ and $B_i$, which for example conform to the standards of the OSI reference model for $A_i$ and the standards of the TCP-IP reference model for $B_i$. In order to be fully implemented, these applications need a certain number of pieces of information and data which are not necessarily found in the memories or in the peripherals associated with the computer HOST. These pieces of information and data can be found in terminals connected to the network RE or even in more remote networks interconnected with this same network RE. Therefore these applications need to establish a dialogue with other applications implemented by terminals connected to RE.

- the sessions $S_1$ and $S_2$ respectively correspond to the applications $A_i$ and $B_i$, which establish precisely the conditions for a dialogue with the corresponding applications of the other terminals in RE. The set of sessions $S_1$ conforms to the standards of the OSI model, while the set of sessions $S_2$ conforms to the standards of the TCP-IP model.

- the two interfaces $IS_1$, $IS_2$, respectively provide transport services to the sessions $S_1$ and $S_2$ for the OSI and TCP-IP models.

- the module TPAM, which supports the transport protocol between the computer HOST and the communication processor NCC, and more particularly the transport protocol between HOST and the part PPA of NCC. TPAM is the English acronym for Transport Protocol Access Module.

- the input/output manager $GES_1$, which is associated with the interface $IP_1$.

The set of elements $IS_1$-$IS_2$, TPAM, $GES_1$ is considered to form a communication server designated NCCD (the letter D stands for Driver in English, a term which corresponds to module). Given that it is possible to associate several communication processors, which are identical to NCC, with the computer HOST, it is evident that in this case, the software architecture of HOST includes several communication servers identical to NCCD, each of which is associated with a predetermined communication processor. In order to simplify the explanation, it will be assumed here and in the remainder of the description below that HOST is associated with only one communications processor NCC, and includes only the one corresponding communication server, namely NCCD.

The various essential elements which constitute the software architecture of the communication processor NCC are the following:

the physical interface $IP_2$ which corresponds to the physical interface $IP_1$, the input/output manager $GES_2$, which corresponds to the input/output manager $GES_1$.

Figure 1:
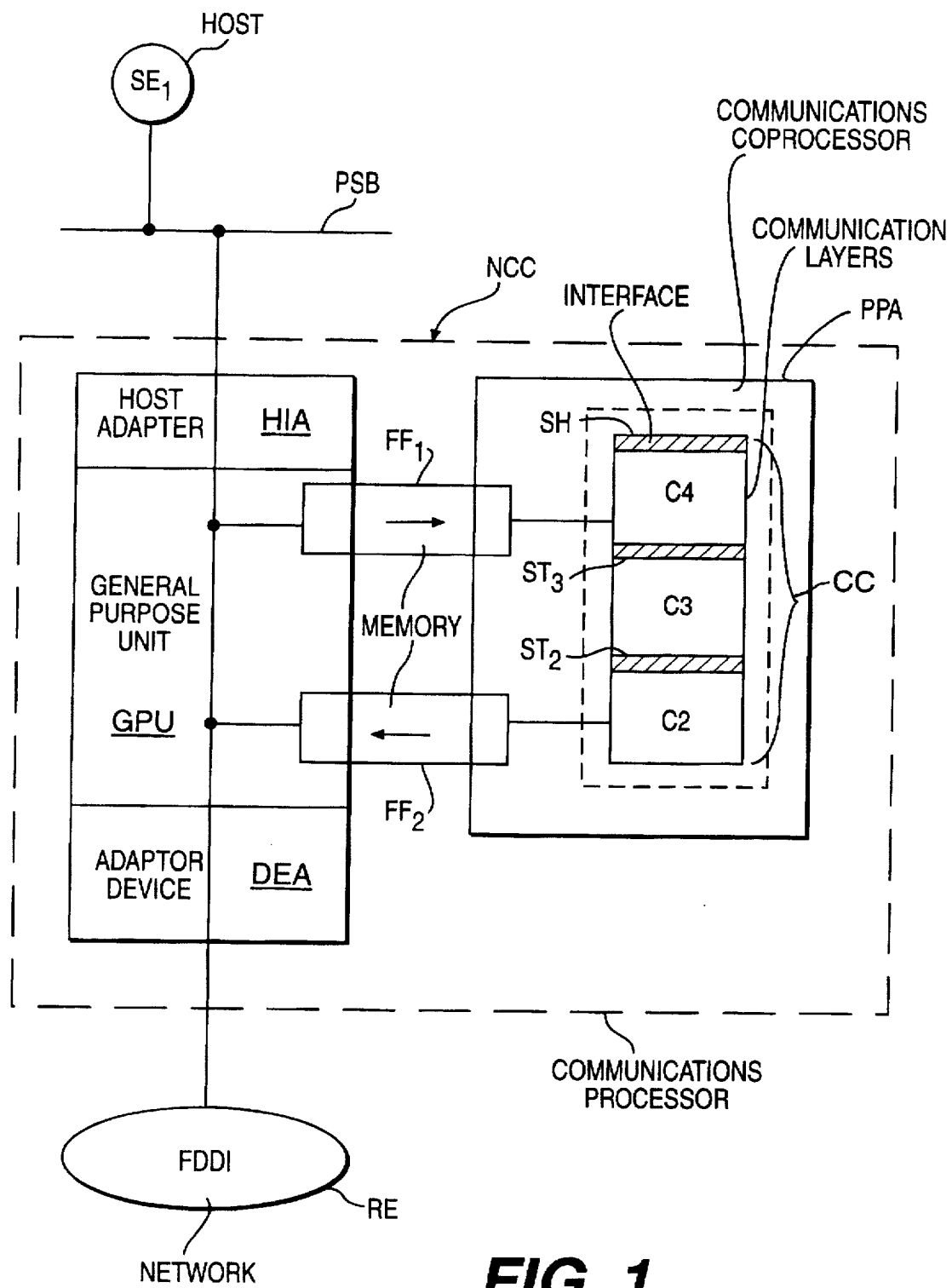
FIG. 1 shows, in a simplified form, the various essential elements which constitute a communication system.

The two physical interfaces $IP_1$ and $IP_2$ are MULTIBUSII interfaces defined by the above-mentioned IEEE1296 standard. They can therefore be embodied in the same way as the element HIA shown in FIG. 1 and can each be constituted by a coprocessor MPC.

The set of the two layers constituted by the MULTIBUSII physical interface and the input/output manager, whether it consists of $GES_1$ and $IP_1$, or $GES_2$ and $IP_2$, is known by the name of the protocol PLANET introduced by the Applicant company and described in French patent No. 2 633 414, which has the title "Centrally Interconnected Information System".

The operating system GPOS which is disposed in the part GPU of NCC is described in the above-mentioned patent application No. 91 08907.

the interface HI (English acronym for Host Interface), disposed in the part PPA, called a host interface, which assures the dialogue between the various layers $C_4$ of the communication code CC and one of the interfaces $IS_1$ or $IS_2$ of HOST. The interface HI therefore assures the transport service between the communication code CC and the sessions $S_1$ and $S_2$ of the host HOST. The interface HI also assures the handling of the data paths between the host HOST and PPA. The interface HI is a software component which is stored in PPA. This interface opens and closes the connections on behalf of HOST as well as on behalf of $C_4$, executes the data transfers and controls the data flow between the host HOST and the communication code CC, whether it involves the part of the communication code which relates to the OSI model or that which relates to the TCP-IP model. The interface SH mentioned above is actually situated between HI and $C_4$.

The interface HI also allows the data flow to use the transport entities of the code CC (Layer $C_4$), by adapting the transport protocols which relate to these layers to the transport protocol TPA used between the host HOST and NCC.

the communication code CC composed of the layers $C_2$ through $C_4$. Thus as stated above, this code relates to the OSI reference model as well as to the TCP-IP model. It has also been stated that it provides the communication stacks $C_2$ through $C_4$ for one of these models, these stacks being designed most often by the English word STACK. The code CC therefore includes an OSI stack and a TCP-IP stack. It is appropriate to note that the layer $C_2$, called LLC, also called the data link layer, is common to these two stacks.

a communication interface HIN between GPOS and CC.

the interface ID and the input/output manager $GES_3$. They form the software of the adaptor device DEA, which is described in the above-mentioned French patent application No. 92 11054, and which makes it possible to connect NCC to the network RE. It is appropriate to add to these last elements the physical interface $IP_3$ for connecting DEA with the network RE, which is also described in this same application.

The mainlines of operation of the architecture, shown in FIG. 2, are the following:

Suppose that any application $A_i$ belonging to the computer HOST wishes to exchange information with any application, called a remote application, situated in any terminal linked to the network RE. This application passes through a corresponding session belonging to the set $S_1$, a session which will carry out the function which is usually devolved to it by the OSI reference model (naturally, the reasoning used here would be the same for an application $B_i$ and a session $S_2$), that is, it will negotiate the establishment and the termination of the dialogue $A_i$ and the remote application with the corresponding session of the receiving terminal connected to the network RE. The session then uses the interface $IS_1$ to dialogue with the interface HI in order to establish the corresponding transport service. In the present case, $IS_1$ is therefore the requester of the transport service, whereas the interface HI is the provider of the transport service which will be used between the system SCI and the remote terminal with which the application $A_i$ is carrying on a dialogue. The module TPAM then takes over from the interface $IS_1$ in order to dialogue with the system GPOS to establish the transport connection between the computer HOST and the communication processor NCC. The transport protocol used between these last two elements is called TPA (Transport Protocol Access). This protocol is a protocol derived from the protocol called TPI (Transport Provider Interface) defined by the company ATT. This protocol allows a controlled exchange of data between the host and the interface HI. It is principally based on the notion of a communication port (Communication Plug). In fact, a port is an element which identifies a connection between the module TPAM and the interface HI. This identification element has a predetermined value.

The protocol TPA defines a message interface to or from the transport provider (the layer $C_4$ of the communication code CC): this indicates that the user (here the application $A_i$) is communicating with the transport provider or that the latter is communicating with the user by means of transport service primitives which transport messages. These messages are transmitted to or from the computer HOST (that is, to or from TPAM) by means of the ports. These ports therefore make it possible to control the exchange of messages between TPAM and GPOS. During its utilization, each port is dedicated to a predetermined transport connection. Thus, different ports which are precisely predetermined correspond to the transport provider of the OSI model, or to the transport provider of the TCP model, or even to the transport provider of the DIWS model (this model, which is also used by the communication system SCI according to the invention, corresponds to the model called ISO/DSA defined by the Applicant). Furthermore, each transport connection (also called a transport session), whether of the OSI, DIWS, or TCP-IP model, is managed by a single connection of the TPA type.

As soon as the exchanges which allow a transport connection to be established between TPA and GPOS are terminated, the input/output manager $GES_1$ and its interface $IP_1$, as well as the corresponding elements $GES_2$ and $IP_2$ take over, in order to transport the data via the bus PSB to the communication processor NCC, according to the protocol "PLANET", in a manner which is summarized in the above-mentioned patent application No. 91 08907. The data are then stored in the memory of the element GPU (this memory is a double access-type memory, and is described more completely in the above-mentioned patent application No. 91 08908).

It is appropriate to note that FIG. 2 represents direct links between $IS_1$ and HI, TPAM and GPOS, and between $GES_1$ and $GES_2$. This indicates that the element $IS_1$ communicates directly with HI, that TPAM communicates directly with GPOS, and that $GES_1$ communicates directly with $GES_2$. It is quite evident, however, that the pieces of information exchanged between each of these elements are conveyed by the other elements which belong to the lower layers. Thus the data exchanged between $IS_1$ and HI are physically conveyed by TPAM and GPOS, just as the pieces of information exchanged between TPAM and GPOS are physically conveyed by $GES_1$ and $GES_2$, and so on.

As soon as the data frames which contain the information relative to the session and to the transport protocol TPA reach the element GPU, this element transmits them to the interface HI which itself transmits them to the various layers $C_4$ of the communication code CC. This communication code CC frees the useful data from the information elements which relate to the transport protocol TPA, and provides them to each of the layers $C_4$ of the corresponding protocols. This is equally true for the OSI, DIWS, and TCP-IP models. It is appropriate to note that the layer $C_2$ is common to these various models. As soon as the element PPA which implements the communication code CC has terminated its operation, the data frames thus constituted are again transmitted, under the control of GPOS, to the double access memory of GPU through HIN and $FF_2$. Then, under the control of GPOS, these data are transmitted to the interface ID, to the input/output manager $GES_3$ and to the corresponding physical interface $IP_3$ of the adaptor device DEA, in a manner which is indicated in the above-mentioned patent application No. 9211054. The data are then transmitted through the network RE and arrive at their final destination.

Conversely, the data frames which originate from RE pass through $IP_3$, $GES_3$ and ID before being stored in the double access memory and then transferred, under the control of GPOS, through the FIFO $FF_2$ and HIN to the layer $C_2$ ($LLC_2$) of CC. PPA then successively implements the layers $C_2$, $C_3$, and then $C_4$ which provides the useful data previously freed from the information elements which relate to TPA, that is, freed from the protocol elements of the layers $C_2$, $C_3$, $C_4$ which are necessary for the flow of the data frames through the network RE. $C_4$ then transmits the data frames thus obtained to HI which sends the data to GPU which, under the control of GPOS, transmits the data through $GES_1$ and $GES_2$ to TPAM, which feeds the data back to $IS_1$-$IS_2$, $S_1$-$S_2$, then $A_i$-$B_i$.

Figure 4:
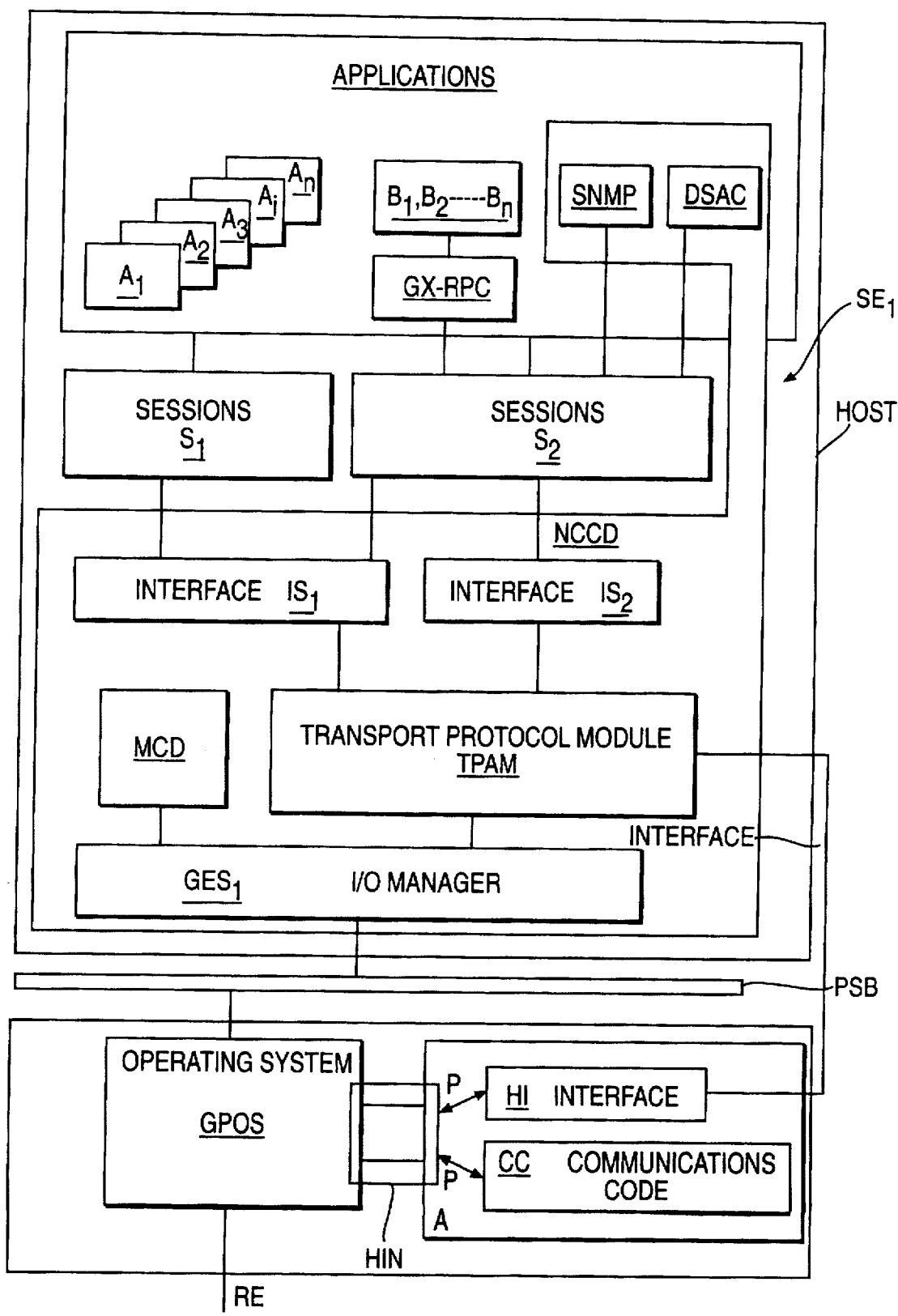
FIG. 4 shows the elements which define the telecommunication server which belongs to the system of the instant invention.

FIG. 4, which shows in more detail the elements which define the module NCCD, and, more particularly, the elements which define $IS_1$, TPAM and $GES_1$ and how they are linked to one another inside the module NCCD, will now be discussed below.

FIG. 4 represents the set of applications $A_1$, $A_2$, ..., $A_i$, $A_n$, as well as the applications $B_1$ through $B_n$.

The applications communicate with the set of sessions $S_1$, which are VCAM-type sessions (in conformity with the OSI, ISO/DSA model). This set of sessions $S_1$ communicates with the interface $IS_1$, which is of the TSI (Transport Session Interface) type, and which is the interface between the VCAM-type sessions and the module TPAM. TSI also assures the interface between the sessions $S_2$ and the module TPAM for the OSI reference models. This interface is described in the documents 2297M/1.0, 2298M/1.0 and 2299M/1.0 of the Applicant company.

The two sets constituted by GX-RPC and $S_2$ constitute a set of sessions which belongs to the GCOS7 operating system adapted to the UNIX environment, and to the TCP-IP reference model. The corresponding interface $IS_2$ is an interface of the GXTIA type (meaning GXTI Access), an interface which belongs to the TCP-IP reference model. GXTI and GXTIA are described in the Applicant's document "Marketing 47A2 64UC Rev. 0" and GX-RPC is described in the documents which relate to GCOS7.

The module TPAM, in addition to supporting the protocol TPA and managing the TPA-type branches as mentioned above, controls the input/output manager $GES_1$.

Furthermore, the module NCCD includes an administrative agent SNMP-DSAC which communicates with the module TPAM through the interface $IS_2$. This agent is known and it is charged with administrating the various layers of the OSI and ISO/DSA reference models (DSAC), and the TCP-IP and FDDI reference models (the agent SNMP, through the SNMP $MIB_2$ standard, an FDDI extension).

Figure 3:
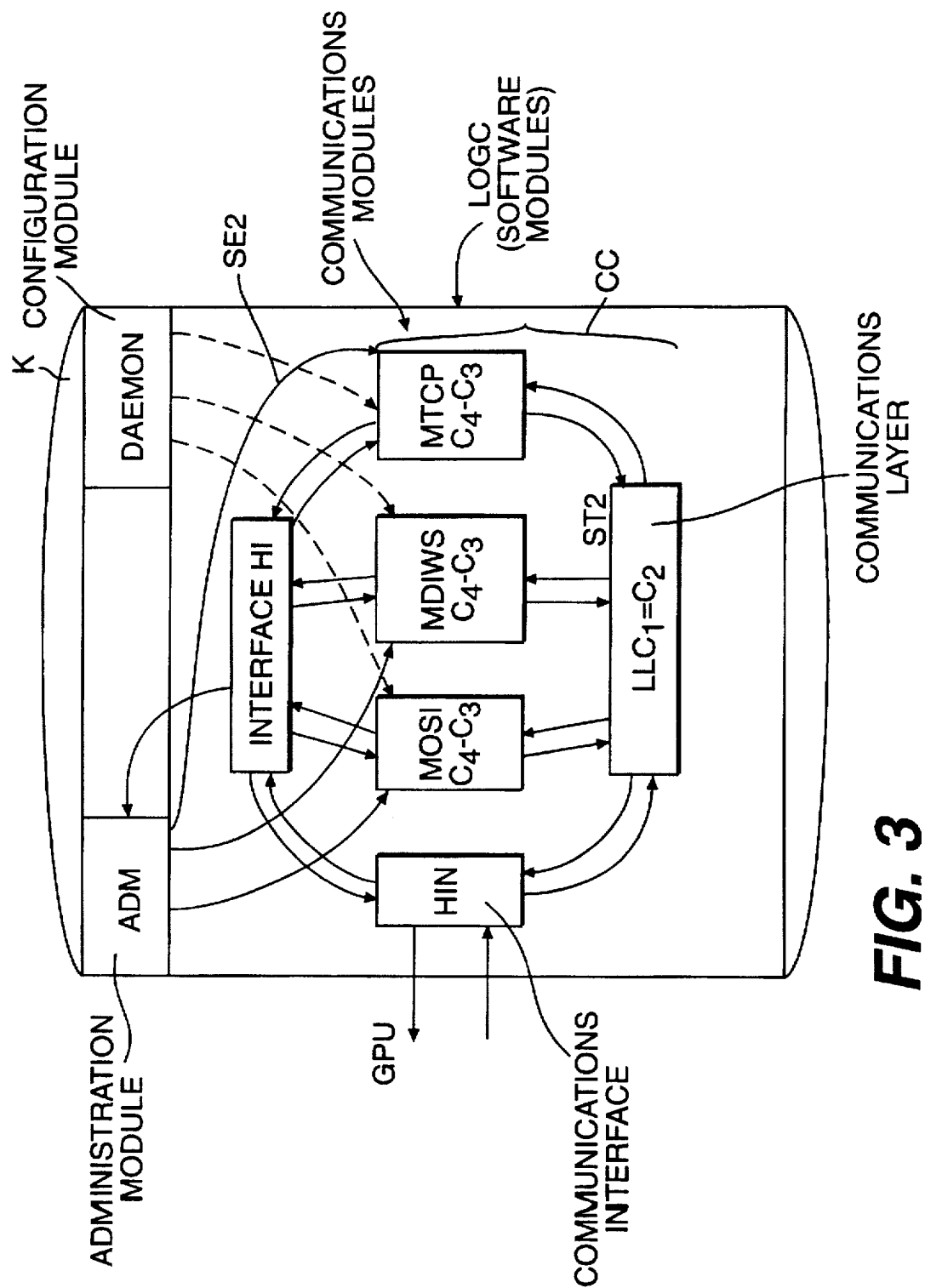
FIG. 3 shows the elements which define the communication code present in the communication coprocessor, which belongs to the system of the instant invention.

FIG. 3, which shows the various software modules which are implemented by the part PPA of the communication controller NCC, will now be explained.

This software module implemented by PPA is here designated LOGC and includes:

- the operating system $SE_2$ which is, for example, the CNS-$A_1$ type of system developed and marketed by the Applicant company.
- the interface HI described above.
- the three communication modules MOSI, MDIWS, MTCP which relate to the part of the communication code CC which implements the layers $C_4$ and $C_3$ of the OSI, ISO/DSA, and TCP-IP reference models.
- the communication layer $LLC_1$ which corresponds to the layer $C_2$ of the OSI, ISO-DSA and TCP-IP reference models. As stated above, the layer $LLC_1$ is common to the three above-mentioned reference models.
- the communication interface HIN between the part PPA and the part GPU. This interface HIN assures the transfer of data between GPU and PPA, for the reception of data frames originating from the network as well as for the emission of data frames into this network. The way in which the interface HIN carries out the data transfer between GPU and PPA, under the control of the operating system GPOS of GPU, is analogous to that described, for example, in either of the patent applications 90 10179 and 9012826, respectively filed on Aug. 9, 1990 and Oct. 17, 1990 by Applicant under the titles "Controller of Communication between a Computer and a Plurality of RNIS-type Terminals" and "Controller of Communication between a Computer and a Plurality of Terminals which Belong to a CSMA/CD-type Network". Both of these applications actually describe the manner in which the data transfer is executed through a communication controller between a base controlled by a first microprocessor and a peripheral controlled by a second microprocessor, these first and second microprocessors playing the same role as the microprocessors which respectively contain the parts GPU and PPA (see the above-mentioned patent applications 91 08908 and 92 15521).
- the configuration module DAEMON which constructs the stack of the various layers belonging to each of the various modules MOSI, MDIWS, MTCP and $LLC_1$. It is necessary to construct this stack by creating links between the various modules by means of various STREAMS-type functions, namely SH between HI and the three modules MOSI, MDIWS, MTCP, and functions ST2 between these modules and the module $LLC_1$. Moreover, it is also necessary to create links between the layers $C_4$ and $C_3$ of these various modules, by means of the primitive functions ST3. In effect, at the initialization of the communication processor NCC and consequently at the initialization of the part PPA, the modules are isolated from one another. This is due to the design philosophy of STREAMS-type functions: By this philosophy, a module does not know with what it is supposed to dialogue, but it does know that it must dialogue with other modules. It is therefore necessary to create these links during initialization.

an administration module ADM which enables the handling of the pieces of information contained in the layers $C_4$ through $C_2$, making it possible to configure them, initialize them, etc. This module therefore communicates with HI through SH and with MOSI, MDIWS, and MTCP by means of the streams functions.

Furthermore, the links between HI and $LLC_1$ on one hand, and the interface HIN on the other hand, are also established by means of STREAMS-type functions.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

We claim:

1. A communication system for communicating (SCI) with a network having a plurality of terminals connected thereto, said system (RE) including a computer (HOST) associated by a bus (PSB) with a communication processor (NCC), said communication processor being linked to a specific link of the network, the computer including a first operating system ($SE_1$) in charge of upper communication layers and associated with a plurality of applications ($A_i$, $B_i$) which exchange data with the terminals and a first input/output manager ($GES_1$) which organizes within the bus a transfer of the data to a second input/output manager ($GES_2$) of the processor (NCC), said processor (NCC) including a second operating system (GPOS) in charge of lower communication layers and which organizes the operation of the processor (NCC) in order to transmit the data from the bus to the network and vice versa, said system comprising:

a telecommunication server (NCCD) associated with the first operating system ($SE_3$) operable to provide transport services to session layers managed by said computer and to handle transport layers between said computer and said communication processor, and a communication code (CC) including lower communication layers from the transport layer, wherein the telecommunication server includes means for enabling the first operating system to access various layers of the communication code (CC), the communication code implementing a component and specific protocols of the component for each of the layers of the communication code, in order to assure transmission to the host or to the network.

2. The communication system according to claim 1, wherein the telecommunication server (NCCD) includes:

at least one interface ($IS_1$, $IS_2$) which provides transport service to at least one session ($S_1$, $S_2$) which belongs to the open systems interconnection model (OSI, TCP-IP), said session corresponding to at least one of said applications ($A_i$, $B_i$);

a module (TPAM) which supports a transport protocol between the computer and the processor; and an input/output manager ($GES_1$) associated with a specific physical interface ($IP_1$) of the bus (PSB), said input/output manager being controlled by said module (TPAM).

3. The communication system according to claim 2, wherein the communication processor (NCC) includes:

a physical interface ($IP_2$) with the bus which corresponds to the physical interface ($IP_1$) of the telecommunication server (NCCD);

an input/output manager ($GES_2$) which corresponds to the input/output manager of the telecommunication server;

wherein a set of two layers ($GES_1$-$IP_1$, $GES_2$-$IP_2$) defined by the physical interface and the input/output manager of the telecommunication server and the communication processor, respectively, constitute a protocol known as PLANET;

the communication code (CC) including the transport, network, and data link communication layers ($C_4$, $C_3$, $C_2$);

an interface (HI) which enables communication between the various layers of the communication code and the interface ($IS_1$) of the session which belongs to the telecommunication server (HIN); and means for connecting the processor (NCC) to the network (RE).

4. The communication system according to claim 3, wherein the communication code (CC) is supported by a third operating system ($SE_2$) which is of the CNS-$A_1$ type, and includes three communication modules (MOSI, MDIWS, MTCP) which respectively relate to a part of the communication code which implements the layers $C_4$ and $C_3$ of the OSI, ISO/DSA, and TCP-IP reference models, the communication layer $C_2$ being common to the reference models.

5. The communication system according to claim 4, wherein the communication processor further includes a configuration module (DAEMON) which constructs a stack of the various layers belonging to each of the three communication modules and further wherein respective links between the communication modules, the communication interfaces (HIN) and the interface (HI), as well as between various layers which comprise each of the modules being provided by STREAMS-type functions.

* * * * *